(12) United States Patent
Gochenour (10) Patent No.: US 6,296,099 B1
(45) Date of Patent: Oct. 2, 2001

(54) SELF ADJUSTING CLUTCH ASSEMBLY

(75) Inventor: Daniel V. Gochenour, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/561,237

(22) Filed: Apr. 28, 2000

(51) Int. Cl.[7] ..................................................... F16D 13/75
(52) U.S. Cl. .................................... 192/70.25; 192/111 A
(58) Field of Search .............................. 192/70.25, 111 A (56) References Cited

U.S. PATENT DOCUMENTS

| | | |
|---|---|---|
| 5,090,537 | 2/1992 | Fukuda . |
| 5,513,735 | 5/1996 | Uenohara . |
| 5,513,736 | 5/1996 | Mizukami . |
| 5,566,804 | 10/1996 | Gochenour et al. . |
| 5,570,768 | 11/1996 | Uenohara et al. . |
| 5,934,429 | 8/1999 | Jennings . |

Primary Examiner—Charles A. Marmor
Assistant Examiner—Saúl Rodríguez
(74) Attorney, Agent, or Firm—Mitchell M. Musial, II (57) ABSTRACT

A friction clutch comprising an adjustment mechanism that includes a stationary annular cam, a rotating cam, a cam biasing spring, a fulcrum ring, a wear sensor and an adjustment limiting device. The stationary annular cam is centered about an axis of rotation and is fixed relative to a pressure plate. The stationary cam has a stationary cam surface with a plurality of ramps thereon. The rotating cam is also centered about an axis of rotation and is rotatable relative to the pressure plate. The rotating cam has a rotating cam surface with a plurality of ramps thereon and is disposed between the adjustment limiting device and the stationary cam. The rotating cam surface is in contact with a stationary cam surface, and rotating cam rotates with respect to the stationary cam to move an axial end of the rotating cam from a first axial position to a second axial position relative to a cover. A cam biasing spring has a first end received in the rotating cam and a second end attached to the pressure plate. The wear sensor is disposed within an aperture located in the cover, and has an axial range of travel from a stop position to a full travel position. The adjustment limiting device has an axial range of travel from a stop position, governed by the pressure plate, to a full travel position. A lever cooperates with the adjustment limiting device to cause an axial end of the rotating cam to rotate from a first position relative to the cover to a second position after wear has occurred on the friction surface when a sufficient adjustment gap allows the rotating cam to rotate.

35 Claims, 6 Drawing Sheets

SELF ADJUSTING CLUTCH ASSEMBLY

FIELD OF THE INVENTION

The present invention relates to the field of friction clutches, and more specifically, to friction clutches having automatic adjustment mechanisms.

BACKGROUND OF THE INVENTION

A friction clutch, or brake, includes a driven member having a friction surface that wears over the life of the device. In order for the friction clutch to continue operating effectively, the relative position of the engaging members must be adjusted or realigned to compensate for wear that occurs on the friction surface.

A friction clutch operates by transmitting torque from a driving member, such as a flywheel, to a driven member, each member rotating about an axis. The driven member is interposed between the flywheel and a pressure plate. A release assembly cooperates with the pressure plate to selectively move the pressure plate axially in order to engage and disengage the friction clutch. As wear occurs on the friction surface of the driven member, the pressure plate moves axially toward the flywheel in order to engage the driven member. Components such as levers or biasing members that contact the pressure plate directly or indirectly are affected by the change in relative position of the pressure plate. Therefore, the change in position of the pressure plate must be compensated in order to maintain proper plate load and freeplay.

With most heavy duty friction clutches, the adjustment of a release bearing and spring assembly is manually achieved in order to compensate for wear on the friction surface of the driven member. Manual adjustment, however, requires continuous monitoring to determine if adjustment is necessary, as well as manpower to perform the adjustment. If the adjustment is not timely completed, the clutch will operate less effectively and will wear prematurely.

It is also known in the art to provide a friction clutch with an automatic adjustment mechanism. While a number of such mechanisms do compensate for wear, numerous parts are typically required to achieve the desired result. Furthermore, more components within a clutch will increase the complexity and cost of manufacture. Still further, a more complicated design will increase the likelihood of failure.

It is therefore a goal of the present invention to provide a friction clutch with an automatic adjustment mechanism which has a simple structure and minimal parts.

SUMMARY OF THE INVENTION

A friction clutch comprises an adjustment mechanism including a stationary annular cam, a rotating annular cam, a cam biasing spring, a fulcrum ring, a wear sensor and an adjustment limiting device. The friction clutch transmits torque from a driving member, having an axis of rotation, to a driven member coupled to an axially extending driven shaft for rotation therewith. A cover is coupled to the driving member for rotation therewith, and a pressure plate is coupled to the cover. The driven member is interposed between the driving member and the pressure plate and has a friction surface connected thereto. The friction surface engages the driving member for transmitting torque from the driving member to the driven member.

The stationary cam has a stationary cam surface and is centered about the axis of rotation and is rotatably fixed relative to the pressure plate. The stationary cam surface has a plurality of ramps thereon. The rotating cam has a rotating cam surface in contact with the stationary cam surface. The rotating cam surface has a plurality of ramps thereon. The rotating cam is disposed between the adjustment limiting device and the stationary cam. The rotating cam rotates with respect to the stationary cam to move an axial end of the rotating cam from a first axial position to a second axial position relative to the pressure plate.

The cam biasing spring has a first and a second end, the first end is received in the rotating cam, and the second end of the cam biasing spring is attached to the pressure plate. The fulcrum ring is centered about the axis of rotation and is operatively coupled to the cover. The wear sensor is disposed within an aperture located in the cover and has an axial range of travel from a stop position to a full travel position. The adjustment limiting device has an axial range of travel from a stop position governed by the pressure plate to a full travel position. The adjustment limiting device cooperates with the rotating cam to govern the amount of rotation of the rotating cam relative to the stationary cam.

A release assembly extends about the driven shaft. A radially extending lever is interposed between the release assembly and the adjustment mechanism. The lever is operatively disposed at an axial end of the release assembly at a first end and cooperates with the fulcrum ring adjacent to a second end. The lever also cooperates with the adjustment limiting device to move the pressure plate to engage and disengage the driven member. The lever further cooperates with the adjustment limiting device to cause an axial end of the rotating cam to rotate from a first position relative to the cover prior to wear to a second position relative to the cover after wear has occurred on the friction surface when the adjustment limiting device has a sufficient adjustment gap to allow the rotating cam to rotate to a second relative position where the second position is axially spaced from the first position limited by the adjustment limiting device.

In a second embodiment, the pressure plate has a stationary cam surface formed upon an axial surface. The rotating cam rotates upon the stationary cam surface with respect to the pressure plate to move an axial end of said rotating cam from a first axial position to a second axial position relative to the pressure plate.

In a third embodiment, the rotating cam has an adjustment limiting device in cooperation with the wear sensor, where the wear sensor governs the axial range of travel of the rotating cam when the rotating cam rotates with respect to the stationary cam surface.

Further objects, features and advantages of the present invention will become apparent to those skilled in the art from analysis of the following written description, the accompanying drawings and appended claims.

DETAILED DESCRIPTION OF THE PREFERRED EMBODIMENT

Figure 1:
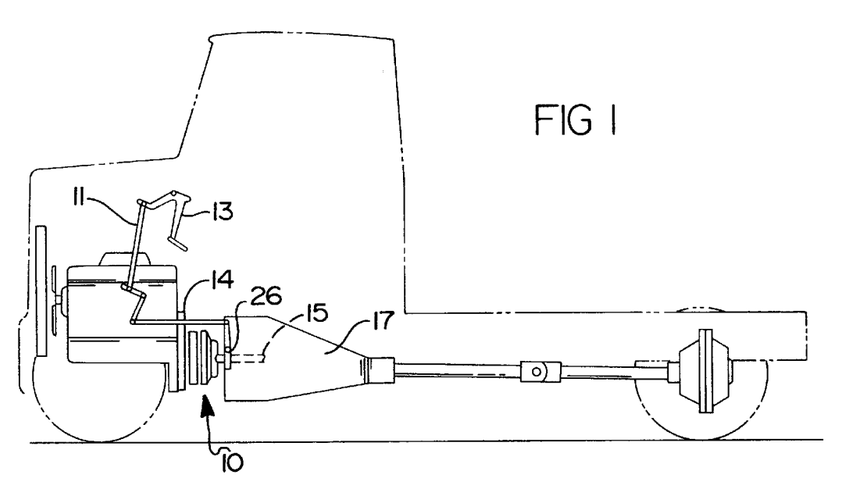
FIG. 1 is an environmental view illustrating an automatically adjusting clutch mounted in a heavy-duty vehicle.

Referring now to FIG. 1, a frictional clutch 10 is shown which selectively transmits torque from a driving member 14, commonly known as a flywheel, to a driven shaft 15 of a vehicle transmission 17. Although the clutch 10 shown in FIG. 1 for illustrative purposes is a twin plate clutch, those skilled in the art will immediately recognize that a single plate clutch could be substituted for a twin plate clutch in practice of the present invention. The flywheel 14 is the member providing torque which is selectively transmitted to the transmission 17. A clutch release assembly 26 is employed for disengaging the friction clutch 10 from the flywheel 14. Translation of the release assembly 26 is achieved by actuating a clutch pedal 13 which is operatively linked to the release assembly 26 by clutch linkage 11. Depressing the pedal 13 will disengage the clutch 10 by moving the release assembly 26.

Figure 2:
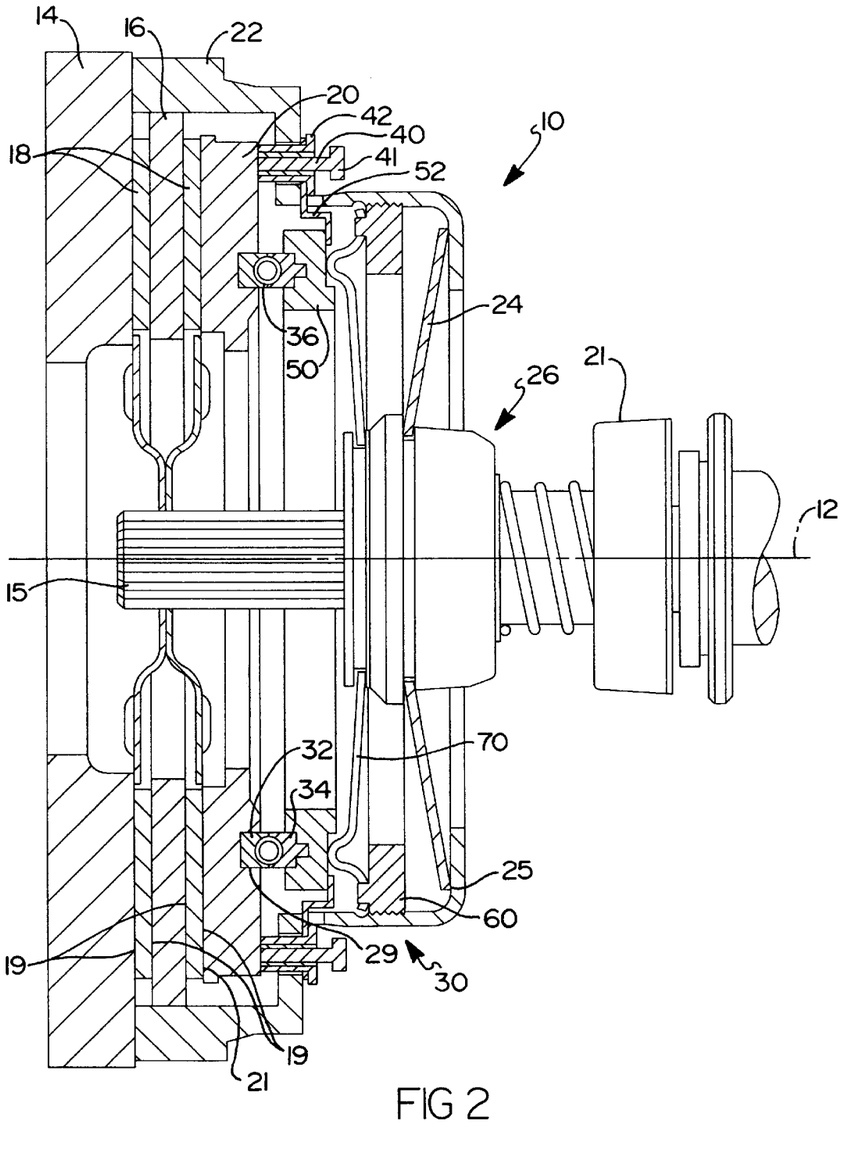
FIG. 2 is a cross-sectional view of the automatically adjusting clutch of the present invention.
Figure 3A:
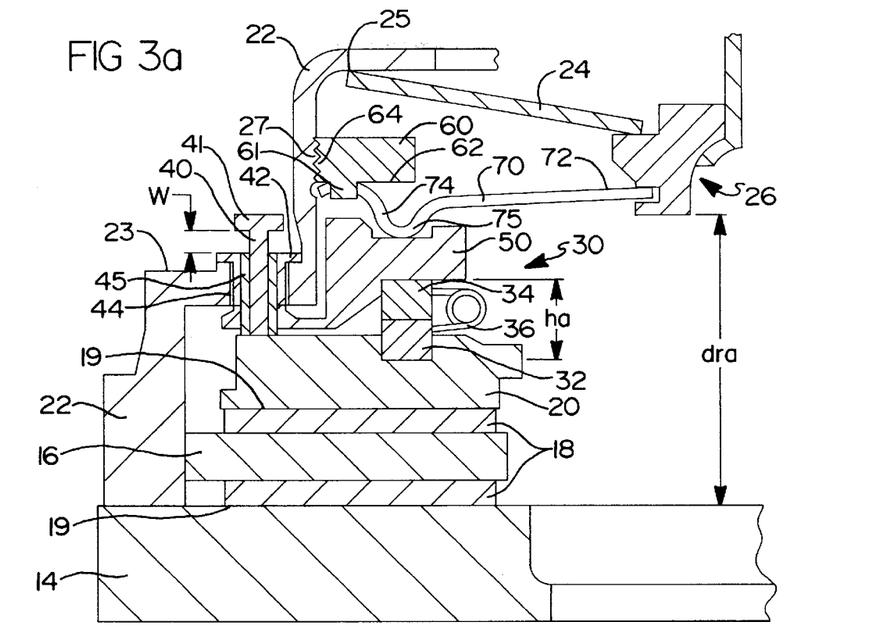
FIG. 3A is a partial radial cross-sectional view of the automatically adjusting clutch of the present invention shown unworn in an engaged position.

Referring now to FIGS. 2 and 3A, a flywheel 14 is coupled to cover 22 for rotation therewith about an axis of rotation 12. The cover 22 is in a fixed position relative to the flywheel 14. A pressure plate 20 is disposed between flywheel 14 and cover 22 adjacent to one of a pair of driven members 18. An intermediate plate 16 is disposed between the driven members 18. The intermediate plate 16 and driven members 18 are interposed between the pressure plate 20 and flywheel 14. The driven members 18 are coupled to the axially extending driven shaft 15 as shown in FIG. 2. The pressure plate 20 is selectively translated to frictionally engage the driven members 18 to transmit torque from the flywheel 14 through the driven members 18 to the driven shaft 15. Driven members 18 have a friction surface 19 on each axial surface.

A pressure plate biasing spring 24 is interposed between the cover 22 and the release assembly 26. In the preferred embodiment plate biasing spring 24 is a diaphragm spring, although one skilled in the art would immediately recognize that a plurality of coil springs could be substituted for a diaphragm spring. A first end of plate biasing spring 24 is in contact with a pivot point 25 on cover 22 and a second end of plate biasing spring 24 is disposed adjacent to an axial end of release assembly 26. Plate biasing spring 24 is provided to bias the pressure plate 20 toward the flywheel 14 as well as provide plate load to the driven members 18 when the frictional clutch 10 is engaged. Plate biasing spring 24 also provides force upon adjustment mechanism 30, preventing adjustment while the clutch 10 is engaged.

Figure 5:
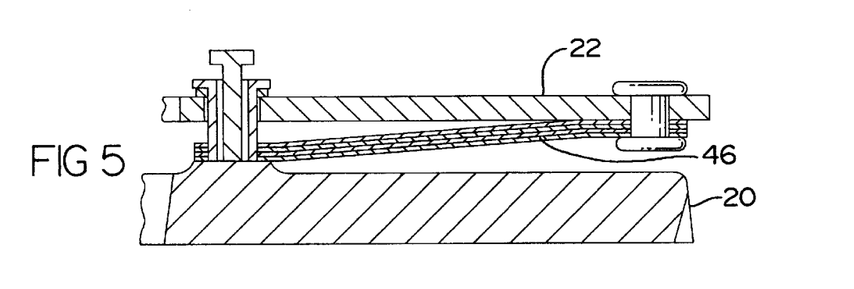
FIG. 5 is a partial radial cross-sectional view of the automatically adjusting clutch of the present invention, revealing the pressure plate, cover and a drive strap.

Referring now also to FIG. 5, a plurality of drive straps 46 are interconnected between the cover 22 and the pressure plate 20 to prevent the pressure plate 20 from rotating with respect to the cover 22. Furthermore, the drive straps also bias the pressure plate 20 away from the flywheel 14 to allow the driven members 16 to spin freely when the frictional clutch 10 is disengaged.

Due to wear on the friction surfaces 19 the driven members 18 and the pressure plate 20 must move an additional axial distance toward the flywheel 14 in order to achieve engagement. During operation of the clutch 10, adjustment mechanism 30 automatically adjusts to compensate for wear on the friction surfaces 19. Adjustment is provided to compensate for the axial distance traveled by the driven members 18 and pressure plate 20 as a result of wear on the friction surfaces 19 of driven members 18. The present invention compensates for wear by increasing the relative thickness of two cams. Used herein, "cam" refers to an annular ring with a plurality of ramp profiles thereon, a plurality of ramp segments fixed to a component, or a cam surface formed on a component. Adjustment is achieved by rotating one of two cams relative to the other to obtain in an increased stack height of the two cams.

In the embodiment disclosed in FIG. 2, the adjustment mechanism 30 includes a stationary annular cam 32, a rotating annular cam 34, a cam biasing spring 36, a fulcrum ring 60, a wear sensor 42 and an adjustment limiting device 50. The stationary annular cam 32, rotating annular cam 34 and fulcrum ring 60 are centered about the axis of rotation 12.

Figure 6:
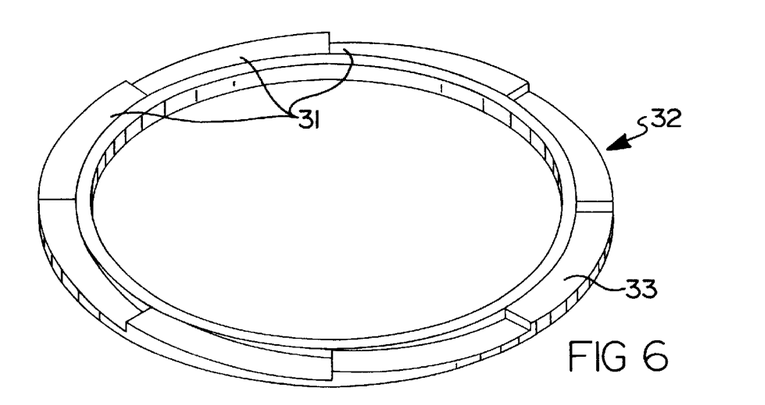
FIG. 6 is a perspective view of one embodiment of a stationary cam according to the principles of the present invention.
Figure 7:
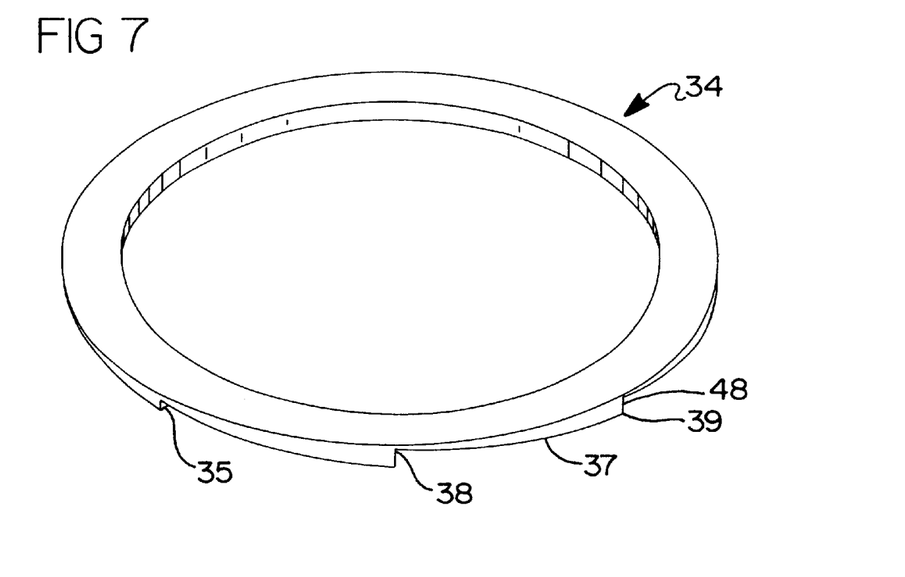
FIG. 7 is a perspective view of one embodiment of a rotating cam according to the principles of the present invention.

The stationary annular cam 32 is disposed within a cam groove 29 located within the pressure plate 20. Stationary annular cam 32 may be affixed to the pressure plate 20 by any suitable means known in the art, including, but not limited to, threaded fasteners or welding. Referring now also to FIG. 6, the stationary cam 32 has a stationary cam surface 33 with a plurality of annular ramps 31. The rotating annular cam 34 is disposed adjacent to the stationary cam 32 and has a rotating cam surface 35 at an axial end in contact with the stationary cam surface 33, as shown in FIG. 7.

Referring again now to FIG. 3A, rotating cam 34 and stationary cam 32 have a stack height indicated by ha. Rotating cam 34 and stationary cam 32 are disposed between the adjustment limiting device 50 and the pressure plate 20. Rotating cam 34 and stationary cam 32 function as a variable height spacer to correct the distance between pressure plate 20 and adjustment limiting device 50 that changes as a result of wear. When rotating cam 34 rotates with respect to stationary cam 32, the relative distance between pressure plate 20 and adjustment limiting device 50 is increased. Referring now also to FIG. 7, one embodiment of rotating cam 34 is shown. The rotating cam surface 35 of rotating cam 34 has a plurality of annular ramps 37. Each of the ramps 37 extends from a first axial location 38 to a second axial location 39, defining an axially extending ledge 48 between the ramps 37.

Figure 8:
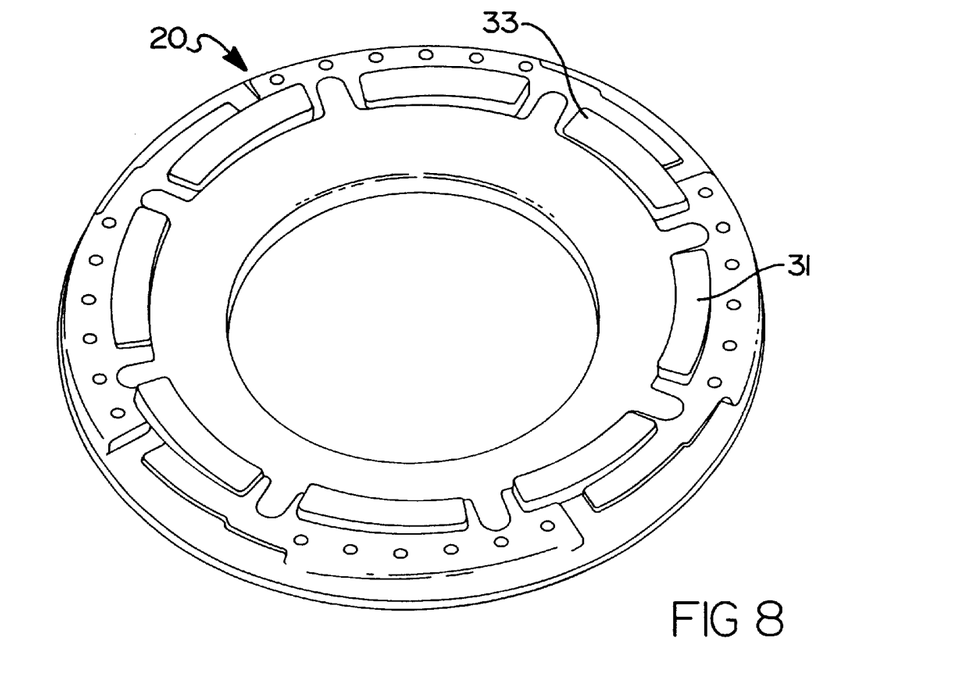
FIG. 8 is a perspective view of a pressure plate according to the principles of the present invention having a stationary cam surface with a plurality of ramps thereon.

Referring now to FIG. 8, in the preferred embodiment stationary cam 32 is eliminated and the rotating cam 34 rotates upon pressure plate 20 having a stationary cam surface 33 comprised of a plurality of ramps 31 upon the pressure plate 20. The ramps 31 are shaped to conform with the ramps 37 of rotating cam surface 35, as shown in FIG. 7. The advantages of eliminating the stationary cam can be appreciated when considering part and assembly cost savings associated with reducing design complexity. Cam surfaces 33 and 35 may include serrations (not shown) to assist in maintaining the contacting surfaces 33 and 35 in relative position.

Referring again now to FIG. 3A, fulcrum ring 60 is operatively coupled to the cover 22 for rotational movement therewith. In the preferred embodiment, the cover 22 includes a threaded portion 27 that cooperates with a threaded portion 64 of fulcrum ring 60. The threaded portion 27 of cover 22 and threaded portion 64 of fulcrum ring 60 permit the fulcrum ring 60 to adjust from a first axial position to a second axial position relative to cover 22 by rotating the fulcrum ring 60. A release bearing 21, shown in FIG. 2, is coupled with the release assembly 26. The initial position of the release bearing 21 may be adjusted by rotating the fulcrum ring 60.

One of a plurality of radially extending levers 70 is interposed between the release assembly 26 and the adjustment mechanism 30. More specifically, the lever 70 is operatively disposed at an axial end of release assembly 26 at a first end 72 and cooperates with fulcrum ring 60 adjacent to a second end 74 of lever 70. In the preferred embodiment, the lever 70 pivots about a pivot point 61 disposed upon an axial surface 62 of fulcrum ring 60. The lever 70 also cooperates with the adjustment limiting device 50 to move the pressure plate 20 to engage and disengage the driven member 18.

Plate biasing spring 24 provides a plate load to the pressure plate 20 by providing force to release assembly 26 which transfers the force to lever 70. Lever 70 pivots about a pivot point 61 disposed upon an axial surface 62 of fulcrum ring 60. Lever 70 transfers the force from the plate biasing spring 24 to adjustment limiting device 50 at a contact point 75. Adjustment limiting device 50 transfers the force to stationary annular cam 32 and rotating annular cam 34 which applies the force to pressure plate 20 for plate load. Referring now also to FIG. 5, disengagement of the clutch 10 will cause the release assembly 26 to move axially away from the flywheel 14, which will cause the lever 70 to pivot about the fulcrum ring pivot point 61 causing the lever 70 to move away from the adjustment limiting device 50, allowing the drive straps 46 to urge pressure plate 20 away from flywheel 14.

Cam biasing spring 36 has a first end which is received in the rotating cam 34 and a second end which is attached to either the stationary cam 32 or to the pressure plate 20. Cam biasing spring 36 may be either attached directly or indirectly to the pressure plate 20 as stationary cam 32 may be securely fastened to, or integrated with, pressure plate 20. Cam biasing spring 36 provides a force to cause rotating cam 34 to move with respect to stationary cam surface 33 located on either the pressure plate 20, if the cam surface 33 is formed thereon, or stationary cam 32. Although the cam biasing spring 36 is shown in tension, it is contemplated to be within the scope of the present invention to employ cam biasing spring 36 in compression. The cam biasing spring 36 may be an extension spring as shown in FIGS. 3A–3D, or a coil spring as shown in FIGS. 4A and 4B. It should become apparent to those skilled in the art that any suitable biasing component may be substituted for a coil spring or an extension spring in order to achieve the desired biasing effect. Referring now to FIG. 3A, cam biasing spring 36 is shown having a first end received in rotating cam 34 and a second end attached to pressure plate 20 indirectly through stationary cam 32.

During adjustment, the rotating cam 34 rotates with respect to the stationary cam 32 to move an axial end of the rotating cam 34 from a first axial position to a second axial position relative to the pressure plate 20 which increases the relative distance between pressure plate 20 and adjustment limiting device 50 by increasing the stack height the of cams 32 and 34. The rotation of rotating cam 34 is limited by the adjustment limiting device 50. The rotating cam 34 may rotate freely with respect to the adjustment limiting device 50 as shown in FIG. 3A or may be secured to the adjustment limiting device 50 as shown in FIG. 4A. Furthermore, in an alternate embodiment, rotating cam 34 may be integrated with adjustment limiting device 50.

A plurality of drive pins 40 are distributed around an outer circumference of the cover 22. Each pin 40 extends through an aperture 44 disposed within the cover 22 and is connected to the pressure plate 20. In the preferred embodiment, pin 40 is threadably received in a radially outer portion of the pressure plate 20, although any suitable method of attachment know in the art may be substituted for a threaded attachment. An opposite end of the pin 40 includes an enlarged head 41. In the preferred embodiment, the pins 40 are press fit into a sleeve 45.

At least one wear sensor 42 is slideably disposed within an aperture 44 disposed in cover 22. The wear sensor 42 slides freely within the aperture 44 to permit the wear sensor 42 to be axially displaced by travel of the pressure plate 20 during engagement and disengagement of the clutch 10. Wear sensor 42 has a slip fit with the sleeve 45 of pin 40. A slip fit as referred to herein is the fit between two surfaces where relative travel between the two surfaces may occur with some resistance. The slip fit causes resistance to relative travel between the pin 40 and the wear indicator 42. Each pin 40 travels with the pressure plate 20 as the clutch 10 is engaged and disengaged. The slip fit allows the wear sensor 42 to travel with the pin 40. In the event of wear on the friction surfaces 19, the pressure plate 20 will move an additional axial distance toward the flywheel 14 causing the pin to move relative to the wear sensor 42. The pin 40 is able to move relative to the wear sensor 42 because the force applied to the pressure plate 20 greatly exceeds the force of the slip fit between the pin 40 and wear sensor 42. Wear sensor 42 has an axial range of travel from a stop position defined by an axial surface 23 of cover 22 to a full travel position, where the full travel position is governed by the axial travel of the pressure plate 20.

A wear gap indicated by "W" in FIGS. 3A–4B is measured between the enlarged head 41 of pin 40 and an axial surface of wear sensor 42. The wear gap indicates the amount of wear remaining on the friction surfaces 19. As the friction surfaces 19 wear, the wear gap decreases, indicating the amount of wear remaining on friction surfaces 19.

Pressure plate 20 and adjustment limiting device 50 move an additional axial distance toward flywheel 14 as a result of wear on the friction surfaces 19. Wear on the friction surfaces 19 also causes the pin 40 to move in an axial direction toward the flywheel 14. However, the wear sensor 42 is prevented from moving beyond its stop position as a result of contact with the axial surface 23 of cover 22.

Figure 3B:
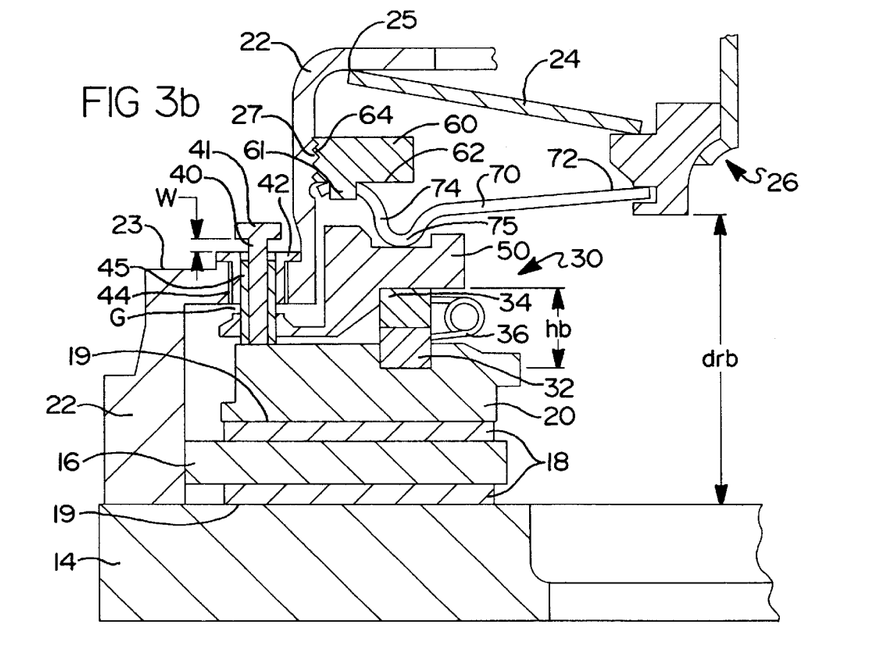
FIG. 3B is a partial radial cross-sectional view of the automatically adjusting clutch of the present invention shown in an engaged position prior to adjustment for wear.
Figure 4A:
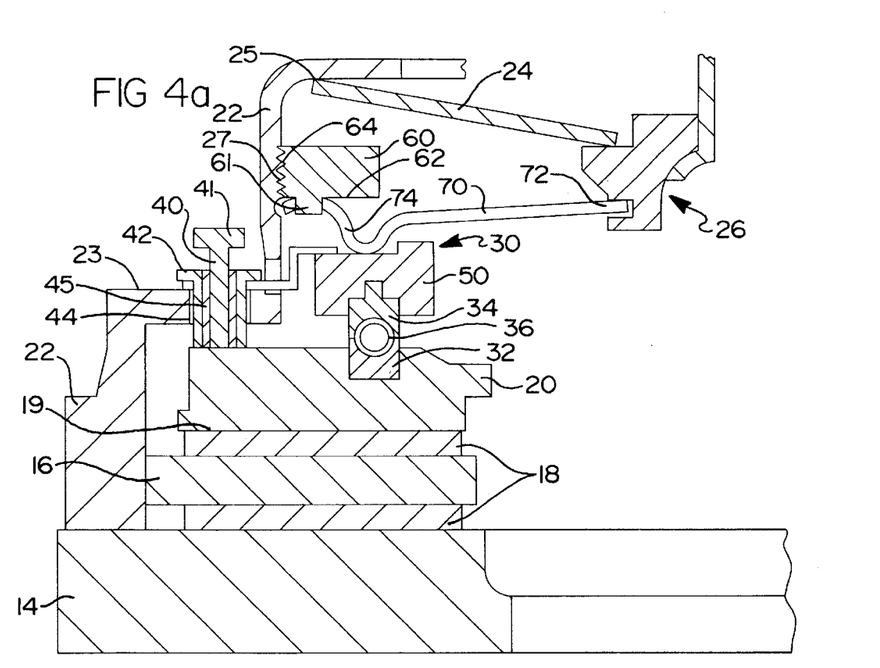
FIG. 4A is a partial radial cross-sectional view of an alternate embodiment of the automatically adjusting clutch of the present invention shown in an engaged position without wear.
Figure 4B:
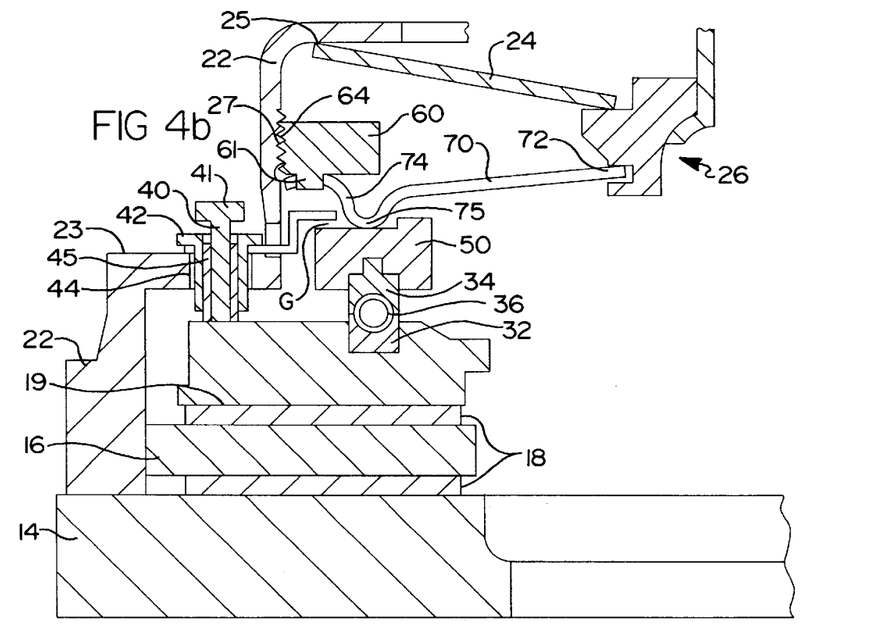
FIG. 4B is a partial radial cross-sectional view of an alternate embodiment of the automatically adjusting clutch of the present invention shown in an engaged position prior to adjustment for wear.

Referring now to FIG. 3B, clutch 10 is shown in an engaged position prior to a first adjustment for wear. An adjustment gap, indicated by "G", between the adjustment limiting device 50 and wear sensor 42 indicates the maximum amount of adjustment that can be achieved by the adjustment mechanism 30 for the amount of wear sustained by friction surfaces 19. The adjustment limiting device 50 has an axial range of travel from a stop position, where the adjustment limiting device contacts the pressure plate 20, to a full travel position, governed by the wear sensor 42. The adjustment limiting device 50 will contact the wear sensor 42 during adjustment to limit the axial movement of the rotating cam 34, therefor the amount of adjustment that can be achieved for a particular state of wear is the equal to the adjustment gap.

Referring now to FIGS. 3A and B, the impact of wear on the clutch 10 of the present invention is shown. The distance between the release assembly 26 and pressure plate 20 in FIGS. 3A and B is indicated by $dr_a$ and $dr_b$, respectively. Clutch 10, as shown in FIG. 3A in an unworn state, will have a distance $dr_a$ between the release assembly 26 and pressure plate 20. As wear occurs, driven members 18 and pressure plate 20 move an axial distance toward the flywheel 14 which will cause the release assembly 26 to also move toward the flywheel 14, resulting in a distance $dr_b$, which is less than $dr_a$. The stack height ha of FIG. 3A is equal to the stack height $h_b$ of FIG. 3B since there has not been an adjustment of clutch 10.

Figure 3C:
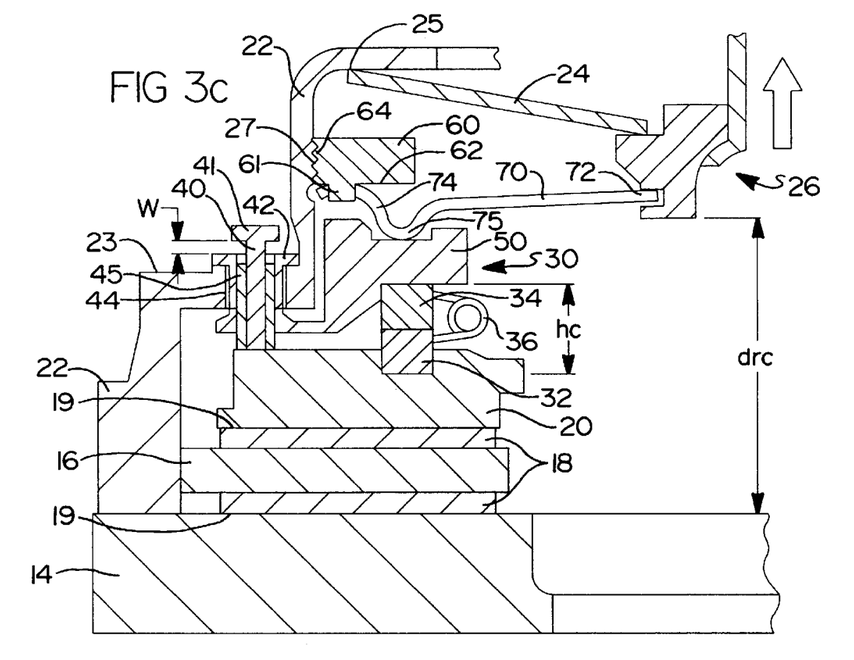
FIG. 3C is a partial radial cross-sectional view of the automatically adjusting clutch of the present invention shown as being in an engaged position immediately after adjustment.

Referring now to FIGS. 3B and C, the mechanics of adjustment of the automatically adjusting clutch 10 of the present invention will be shown. FIG. 3C is a cross-sectional view of the clutch 10 of the present invention, shown as it is being disengaged immediately after adjustment as indicated by the arrow. When a minimum amount of wear has occurred on the friction surfaces 19 to allow for adjustment, the adjustment mechanism 30 of the clutch 10 will compensate for the wear as the clutch 10 is subsequently disengaged.

As the clutch 10 is disengaged, the release assembly 26 moves away from the flywheel 14, as indicated by the arrow in FIG. 3C. Axial displacement of the release assembly 26 will cause lever 70 to pivot about pivot point 61 whereby contact point 75 of lever 70 is axially displaced away from the flywheel 14. The plate load provided by the pressure plate biasing spring 24 is removed from the adjustment limiting device 50 and pressure plate 20 by the displacement of the lever 70. Once the plate load is removed, the cam biasing spring 36 causes the rotating cam 34 to rotate with respect to the stationary cam 32. The rotating cam 34 is in contact with adjustment limiting device 50. Rotating cam 34 will rotate from a first axial position to a second axial position relative to the pressure plate 20 until the adjustment limiting device 50 contacts the wear sensor 42.

The stack height of the cams 32 and 34 is indicated by $h_c$ in FIG. 3C. The second axial position of rotating cam 34 is axially spaced from the first axial position by a distance equal to $h_c-h_b$. Adjustment of clutch 10 will displace the adjustment limiting device 50 away from the flywheel 14 until contact with the wear sensor 42 is made, causing the release assembly 26 to move from a distance $dr_b$ to a distance $dr_c$ as shown in FIG. 3C. The wear gap, which indicates the amount of clutch wear remaining, indicated by "w" in FIG. 3C is unchanged from the wear gap of FIG. 3B. The adjustment gap, indicated by "G", is eliminated as the adjustment limiting device 50 makes contact with the wear sensor 42.

Figure 3D:
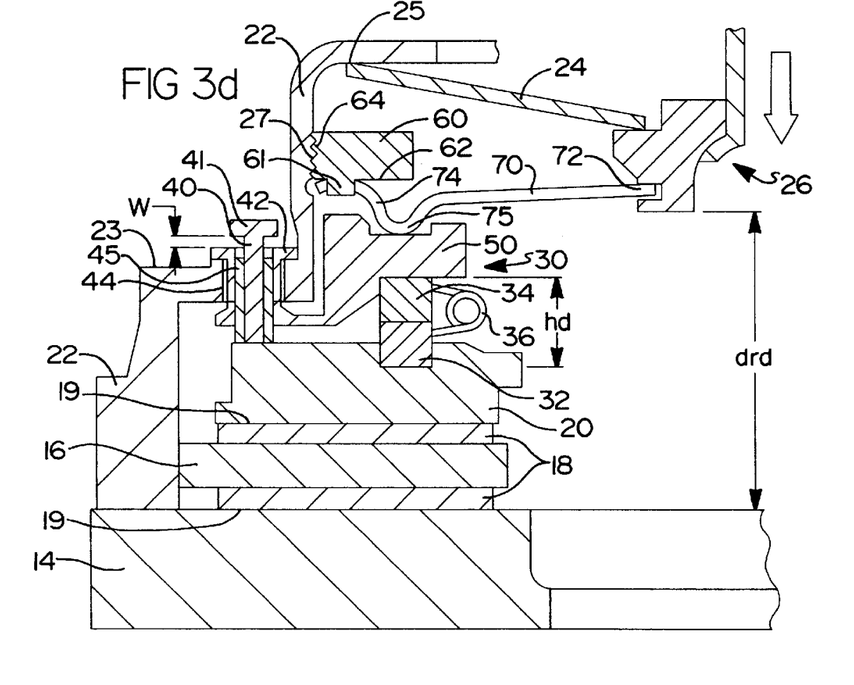
FIG. 3D is a partial radial cross-sectional view of the automatically adjusting clutch of the present invention shown in a reengaged position after adjustment.

Referring now to FIG. 3D, a cross-sectional view of the clutch 10 of the present invention is shown as it is engaged immediately after adjustment. As the clutch 10 is engaged, the release assembly 26 moves toward the flywheel 14, as indicated by the arrow in FIG. 3D. The distance $dr_d$ of FIG. 3D is equivalent to $dr_c$, of FIG. 3C. Also, the stack height $h_d$ in FIG. 3D of the cams 32 and 34 is the same as stack height $h_c$, in FIG. 3C. An adjustment gap may occur if appreciable wear occurred during engagement or disengagement of clutch 10.

An alternate embodiment is revealed in FIGS. 4A and 4B where rotating cam 34 is coupled to the adjustment limiting device 50. A bracket 52 is interposed between the wear sensor 42 and the adjustment limiting device 50. An adjustment gap, indicated by "G", between the bracket 52 and adjustment limiting device 50 indicates the maximum amount of adjustment available. As the clutch 10 is disengaged, rotating cam 34 rotates from a first axial position to a second axial position relative to the pressure plate 20 until adjustment limiting device 50 contacts bracket 52. In the present embodiment, bracket 52 limits the axial movement of the adjustment limiting device 50. The adjustment limiting device 50 limits the amount of rotation of the rotating cam 34. Those skilled in the art will readily appreciate that rotating cam 34 may be coupled to adjustment limiting device 50 by any means known to the art including welding, threaded fasteners, an interference fit, or by a plurality of teeth. Furthermore, rotating cam 34 may be integrated with adjustment limiting device 50 as a single unit (not shown).

The foregoing discussion discloses and describes the preferred embodiment of the present invention. However, one skilled in the art will readily recognize from such discussion and from the accompanying drawings and claims that various changes, modifications and variations can be made therein without departing from the true spirit and fair scope of the invention as defined in the following claims.

What is claimed is:

1. A friction clutch, comprising:

a driving member having an axis of rotation;

a cover coupled to said driving member for rotation therewith;

a pressure plate coupled to said cover for rotation therewith;

a driven member coupled to an axially extending driven shaft for rotation therewith, said driven member interposed between said driving member and said pressure plate;

a friction surface connected to said driven member, said friction surface engaging said driving member for transmitting torque from said driving member to said driven member;

a release assembly extending about the driven shaft;

an adjustment mechanism including a stationary annular cam, a rotating annular cam, a cam biasing spring, a fulcrum ring, and an adjustment limiting device, said stationary cam centered about the axis of rotation and rotatably fixed relative to said pressure plate, said stationary cam having a stationary cam surface at an axial end with a plurality of ramps thereon, said rotating cam centered about the axis of rotation and rotatable relative to said pressure plate, said rotating cam having a rotating cam surface at an axial end with a plurality of ramps thereon, said rotating cam disposed between said adjustment limiting device and said stationary cam, said rotating cam surface in contact with said stationary cam surface, said rotating cam rotates with respect to said stationary cam to move an axial end of said rotating cam from a first axial position to a second axial position relative to said pressure plate, said cam biasing spring having a first end and a second end, said first end being received in said rotating cam, said second end of said cam biasing spring being attached to said pressure plate, said fulcrum ring centered about the axis of rotation, said fulcrum ring operatively coupled to said cover, said adjustment limiting device having an axial range of travel from a stop position governed by said pressure plate to a full travel position, said adjustment limiting device cooperating with said rotating cam to control the amount of rotation of said rotating cam relative to said stationary cam; and a radially extending lever interposed between said release assembly and said adjustment mechanism, said lever being operatively disposed at an axial end of said release assembly at a first end and said lever cooperating with said fulcrum ring adjacent to a second end, said lever also cooperating with said adjustment limiting device to move said pressure plate to engage and disengage said driven member, said lever further cooperating with said adjustment limiting device to cause an axial end of said rotating cam being at a first position relative to said pressure plate, prior to wear on said friction surface, to rotate to a second position relative to said pressure plate, after wear has occurred on said friction surface, when the adjustment limiting device has a sufficient adjustment gap to allow the rotating cam to rotate to said second position, where said second position is axially spaced from said first position limited by said adjustment limiting device.

2. The friction clutch as claimed in claim 1, wherein said adjustment mechanism further includes a wear sensor disposed within an aperture located in said cover, said wear sensor having an axial range of travel from a stop position to a full travel position.

3. The friction clutch as claimed in claim 1, wherein said rotating cam is coupled to said adjustment limiting device.

4. The friction clutch as claimed in claim 1, further comprising a bracket interposed between said wear sensor and said adjustment limiting device.

5. The friction clutch as claimed in claim 1, wherein said fulcrum ring said fulcrum ring is adjustable to move an axial surface of said fulcrum ring from a first axial position to a second axial position relative to said cover.

6. The friction clutch as claimed in claim 1, further comprising a pressure plate biasing spring disposed between said release assembly and said cover.

7. The friction clutch as claimed in claim 6, wherein said pressure plate biasing spring is a diaphragm spring.

8. The friction clutch as claimed in claim 6, wherein said pressure plate biasing spring includes a plurality of coil springs.

9. The friction clutch as claimed in claim 1, wherein said cam biasing spring is an extension spring.

10. The friction clutch as claimed in claim 1, wherein said cam biasing spring is a coil spring.

11. The friction clutch as claimed in claim 1, wherein said rotating cam is comprised of a plurality of ramp segments fixed to a component.

12. The friction clutch as claimed in claim 1, wherein said stationary cam is comprised of a plurality of ramp segments fixed to a component.

13. A friction clutch, comprising:

a driving member having an axis of rotation;

a cover coupled to said driving member for rotation therewith;

a pressure plate coupled to said cover for rotation therewith, said pressure plate having a driven member surface at a first axial end and a stationary cam surface comprising a plurality of ramps thereon at a second axial end;

a driven member coupled to an axially extending driven shaft for rotation therewith, said driven member interposed between said driving member and said pressure plate;

a friction surface connected to said driven member, said friction surface engaging said driving member for transmitting torque from said driving member to said driven member;

a release assembly extending about the driven shaft;

an adjustment mechanism including a rotating annular cam, a cam biasing spring, a fulcrum ring, and an adjustment limiting device, said rotating cam centered about the axis of rotation and rotatable relative to said pressure plate, said rotating cam having a rotating cam surface at an axial end with a plurality of ramps thereon, said rotating cam disposed between said adjustment limiting device and said pressure plate, said rotating cam surface in contact with said stationary cam surface, said rotating cam rotates with respect to said stationary cam surface to move an axial end of said rotating cam from a first axial position to a second axial position relative to said pressure plate, said cam biasing spring having a first end and a second end, said first end being received in said rotating cam, said second end of said cam biasing spring being attached to said pressure plate, said fulcrum ring centered about the axis of rotation, said fulcrum ring operatively coupled to said cover, said adjustment limiting device having an axial range of travel from a stop position governed by pressure plate to a full travel position, said adjustment limiting device cooperating with said rotating cam to control the amount of axial travel of said rotating cam relative to said stationary cam; and a radially extending lever interposed between said release assembly and said adjustment mechanism, said lever being operatively disposed at an axial end of said release assembly at a first end and said lever cooperating with said fulcrum ring adjacent to a second end, said lever also cooperating with said adjustment limiting device to move said pressure plate to engage and disengage said driven member, said lever further cooperating with said adjustment limiting device to cause an axial end of said rotating cam being at a first position relative to said pressure plate, prior to wear on said friction surface, to rotate to a second position relative to said pressure plate, after wear has occurred on said friction surface, when the adjustment limiting device has a sufficient adjustment gap to allow the rotating cam to rotate to said second position, where said second position is axially spaced from said first position limited by said adjustment limiting device.

14. The friction clutch as claimed in claim 13, wherein said adjustment mechanism further includes a wear sensor disposed within an aperture located in said cover, said wear sensor having an axial range of travel from a stop position to a full travel position.

15. The friction clutch as claimed in claim 13, wherein said rotating cam is coupled to said adjustment limiting device.

16. The friction clutch as claimed in claim 13, further comprising a bracket interposed between said wear sensor and said adjustment limiting device.

17. The friction clutch as claimed in claim 13, wherein said fulcrum ring said fulcrum ring is adjustable to move an axial surface of said fulcrum ring from a first axial position to a second axial position relative to said cover.

18. The friction clutch as claimed in claim 13, further comprising a pressure plate biasing spring disposed between said release assembly and said cover.

19. The friction clutch as claimed in claim 18, wherein said pressure plate biasing spring is a diaphragm spring.

20. The friction clutch as claimed in claim 18, wherein said pressure plate biasing spring includes a plurality of coil springs.

21. The friction clutch as claimed in claim 13, wherein said cam biasing spring is an extension spring.

22. The friction clutch as claimed in claim 13, wherein said cam biasing spring is a coil spring.

23. The friction clutch as claimed in claim 13, wherein said rotating cam is comprised of a plurality of ramp segments fixed to a component.

24. The friction clutch as claimed in claim 13, wherein said stationary cam surface is comprised of a plurality of ramp segments fixed to said pressure plate.

25. A friction clutch, comprising:

a driving member having an axis of rotation;

a cover coupled to said driving member for rotation therewith;

a pressure plate coupled to said cover for rotation therewith;

a driven member coupled to an axially extending driven shaft for rotation therewith, said driven member interposed between said driving member and said pressure plate;

a friction surface connected to said driven member, said friction surface engaging said driving member for transmitting torque from said driving member to said driven member;

a release assembly extending about the driven shaft;

an adjustment mechanism including a stationary annular cam, a rotating annular cam, a cam biasing spring, and a fulcrum ring, said stationary cam centered about the axis of rotation and rotatably fixed relative to said pressure plate, said stationary cam having a stationary cam surface at an axial end with a plurality of ramps thereon, said rotating cam centered about the axis of rotation and rotatable relative to said pressure plate, said rotating cam having a rotating cam surface at an axial end with a plurality of ramps thereon, said rotating cam disposed between said adjustment limiting device and said stationary cam, said rotating cam surface in contact with said stationary cam surface, said rotating cam rotates with respect to said stationary cam to move an axial end of said rotating cam from a first axial position to a second axial position relative to said pressure plate, said rotating cam having an adjustment limiting device with an axial range of travel from a stop position governed by said pressure plate to a full travel position, said adjustment limiting device to control the amount of rotation of said rotating cam relative to said stationary cam, said cam biasing spring having a first end and a second end, said first end being received in said rotating cam, said second end of said cam biasing spring being attached to said pressure plate, said fulcrum ring centered about the axis of rotation, said fulcrum ring operatively coupled to said cover, said wear sensor disposed within an aperture located in said cover; and a radially extending lever interposed between said release assembly and said adjustment mechanism, said lever being operatively disposed at an axial end of said release assembly at a first end and said lever cooperating with said fulcrum ring adjacent to a second end, said lever also cooperating with said adjustment limiting device to move said pressure plate to engage and disengage said driven member, said lever further cooperating with said adjustment limiting device to cause an axial end of said rotating cam being at a first position relative to said pressure plate, prior to wear on said friction surface, to rotate to a second position relative to said pressure plate, after wear has occurred on said friction surface, when the adjustment limiting device has a sufficient adjustment gap to allow the rotating cam to rotate to said second position, where said second position is axially spaced from said first position limited by said adjustment limiting device.

26. The friction clutch as claimed in claim 25, wherein said adjustment mechanism further includes a wear sensor disposed within an aperture located in said cover, said wear sensor having an axial range of travel from a stop position to a full travel position.

27. The friction clutch as claimed in claim 25, further comprising a bracket interposed between said wear sensor and said adjustment limiting device.

28. The friction clutch as claimed in claim 25, wherein said fulcrum ring said fulcrum ring is adjustable to move an axial surface of said fulcrum ring from a first axial position to a second axial position relative to said cover.

29. The friction clutch as claimed in claim 25, further comprising a pressure plate biasing spring disposed between said release assembly and said cover.

30. The friction clutch as claimed in claim 29, wherein said pressure plate biasing spring is a diaphragm spring.

31. The friction clutch as claimed in claim 29, wherein said pressure plate biasing spring includes a plurality of coil springs.

32. The friction clutch as claimed in claim 25, wherein said cam biasing spring is an extension spring.

33. The friction clutch as claimed in claim 25, wherein said cam biasing spring is a coil spring.

34. The friction clutch as claimed in claim 25, wherein said rotating cam is comprised of a plurality of ramp segments fixed to a component.

35. The friction clutch as claimed in claim 25, wherein said stationary cam is comprised of a plurality of ramp segments fixed to a component.

* * * * *